(12) United States Patent
French et al.

(10) Patent No.: US 10,650,143 B2
(45) Date of Patent: May 12, 2020

(54) MICROCONTROLLER

(71) Applicant: Airbus Group Limited, London (GB)

(72) Inventors: Richard French, Bristol (GB); Viktoriya Degeler, Bristol (GB); Kevin Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 195 days.

(21) Appl. No.: 15/964,273

(22) Filed: Apr. 27, 2018

(65) Prior Publication Data

US 2018/0314824 A1 Nov. 1, 2018

(30) Foreign Application Priority Data

Apr. 27, 2017 (GB) .................................. 1706691.1

(51) Int. Cl.
*G06F 21/55* (2013.01)
*G06F 21/86* (2013.01)

(52) U.S. Cl.
CPC ............ *G06F 21/554* (2013.01); *G06F 21/86* (2013.01); *G06F 2221/034* (2013.01)

(58) Field of Classification Search
CPC ............................... G06F 21/554; G06F 21/86
See application file for complete search history.

(56) References Cited

U.S. PATENT DOCUMENTS

| | | | |
|---|---|---|---|
| 6,125,456 A | 9/2000 | Takahashi | |
| 6,845,419 B1 * | 1/2005 | Moyer | .................... G06F 13/26 710/261 |
| 9,025,598 B1 * | 5/2015 | Erb | .......................... G02B 6/43 370/389 |
| 9,419,854 B1 * | 8/2016 | Wang | ....................... H04L 41/00 |
| 9,688,399 B1 * | 6/2017 | Dobbins | .............. G05D 1/0094 |
| 2005/0123000 A1 * | 6/2005 | Sato | ........................ G08C 19/14 370/480 |
| 2006/0021035 A1 | 1/2006 | Conti et al. | |
| 2006/0156380 A1 | 7/2006 | Gladstone et al. | |
| 2008/0120517 A1 * | 5/2008 | Gogniat | .................. G06F 11/28 714/2 |

(Continued)

OTHER PUBLICATIONS

Combined Search and Examination Report for GB 1706691.1, dated Oct. 11, 2017, 5 pages.
Degeler et al., "Self-Healing Intrusion Detection System Concept," 2016 IEEE 2nd International Conference on Big Data Security on Cloud (BigDataSecurity), IEEE International Conference on High Performance and Smart Computing (HPSC), and IEEE International Conference on Intelligent Data and Security (IDS), New York, NY, 2016, pp. 351-356.

(Continued)

*Primary Examiner* — Ali Shayanfar
(74) *Attorney, Agent, or Firm* — Nixon & Vanderhye P.C.

(57) ABSTRACT

A microcontroller with a built-in self-healing function. A programmable memory stores a normal control routine. A processing unit is arranged to execute the normal control routine in order to provide output data on the output line. A danger signal input line which is connected to a logic unit and dedicated to communicating a danger signal to the logic unit. Processor and logic unit state lines are provided between the processing unit and the logic unit for communicating processor state data from the processing unit to the logic unit and communicating logic unit state data from the logic unit to the processing unit. An interrupt line between the logic unit and the processing unit is dedicated to communicating an interrupt signal from the logic unit to the processing unit.

9 Claims, 4 Drawing Sheets

(56) References Cited

U.S. PATENT DOCUMENTS

| | | | | |
|---|---|---|---|---|
| 2010/0023310 | A1* | 1/2010 | Knauss | G06F 9/455 |
| | | | | 703/23 |
| 2010/0185903 | A1 | 7/2010 | Horn et al. | |
| 2012/0155580 | A1* | 6/2012 | Wang | H04L 27/3863 |
| | | | | 375/344 |
| 2012/0226842 | A1* | 9/2012 | Evans | G06F 13/26 |
| | | | | 710/264 |
| 2014/0269364 | A1* | 9/2014 | Knapp | H04L 41/0823 |
| | | | | 370/252 |
| 2014/0354350 | A1* | 12/2014 | Bowers | H03F 3/195 |
| | | | | 327/564 |
| 2015/0188707 | A1 | 7/2015 | Gehrer et al. | |
| 2015/0266436 | A1* | 9/2015 | Erb | B64D 45/00 |
| | | | | 340/870.28 |
| 2017/0274992 | A1* | 9/2017 | Chretien | B64C 27/14 |

OTHER PUBLICATIONS

Degeler et al., "Combined Danger Signal and Anomaly-Based Threat Detection in Cyber-Physical System" in (eds) Internet of Things. IoT Infrastructures. IoT360 2015. Lecture Notes of the Institute for Computer Sciences, Social Informatics and Telecommunications Engineering, vol. 169. Springer, Cham, 12 pages.

Mehta et al., "Anomaly-Based Intrusion Detection System for Embedded Devices on Internet" CENICS 2017 : The Tenth International Conference on Advances in Circuits, Electronics and Micro-electronics, 5 pages.

Mitchell et al., "Behavior Rule Specification-Based Intrusion Detection for Safety Critical Medical Cyber Physical Systems," in IEEE Transactions on Dependable and Secure Computing, vol. 12, No. 1, Jan.-Feb. 1, 2015, 14 pages.

* cited by examiner

MICROCONTROLLER

RELATED APPLICATION

This application claims priority to United Kingdom Patent Application No. GB 1706691.1, filed Apr. 27, 2017, the entire contents of which is incorporated by reference.

FIELD OF THE INVENTION

The present invention relates to a microcontroller.

BACKGROUND OF THE INVENTION

Microcontrollers can be susceptible to harm from malicious code, such as the STUXNET malware. The present invention seeks to provide a microcontroller with an element of protection from malicious code of this type.

A microcomputer with a self-diagnostic unit is described in U.S. Pat. No. 6,125,456; and a method for safeguarding a system-on-a-chip is described in US2015/0188707.

A self-healing intrusion detection system concept is described in V. Degeler, R. French and K. Jones, "Self-Healing Intrusion Detection System Concept," 2016 IEEE 2nd International Conference on Big Data Security on Cloud (BigDataSecurity), IEEE International Conference on High Performance and Smart Computing (HPSC), and IEEE International Conference on Intelligent Data and Security (IDS), New York, N.Y., 2016, pp. 351-356. doi: 10.1109/BigDataSecurity-HPSC-IDS.2016.27.

A threat detection method is described in Degeler V., French R., Jones K. (2016) Combined Danger Signal and Anomaly-Based Threat Detection in Cyber-Physical Systems. In: Mandler B. et al. (eds) Internet of Things. IoT Infrastructures. IoT360 2015. Lecture Notes of the Institute for Computer Sciences, Social Informatics and Telecommunications Engineering, vol 169. Springer, Cham.

SUMMARY OF THE INVENTION

A first aspect of the present invention provides a microcontroller as set out in claim 1. The microcontroller comprises: a programmable memory storing a normal control routine; an output line; a processing unit arranged to execute the normal control routine in order to provide output data on the output line; a logic unit; a danger signal input line which is connected to the logic unit and dedicated to communicating a danger signal to the logic unit; one or more processor state lines between the processing unit and the logic unit for communicating processor state data from the processing unit to the logic unit; one or more logic unit state lines between the logic unit and the processing unit for communicating logic unit state data from the logic unit to the processing unit; an interrupt line between the logic unit and the processing unit which is dedicated to communicating an interrupt signal from the logic unit to the processing unit; and a read-only-memory storing a danger interrupt service routine. Preferably the programmable memory, the processing unit, the logic unit and the read-only-memory are on a single chip of semiconductor material. Preferably the logic unit is separate from the processing unit so that the processing unit cannot change any aspect of the operation of the logic unit.

The logic unit is arranged to communicate its interrupt signal to the processing unit via its dedicated interrupt line in response to receipt of the danger signal on the danger signal input line. The processing unit is arranged to always respond to the receipt of the interrupt signal from the logic unit on the dedicated interrupt line by interrupting the normal control routine, or any other routine executing on the processing unit, and executing the danger interrupt service routine stored in the read-only memory. The logic unit is arranged to store processor state data from the one or more processor state lines, for instance to provide a timeline of stored state data, the stored state data being associated with the normal control routine executing on the processing unit. The logic unit is arranged to learn a correlation between the receipt of the danger signal on the danger signal input line and a subset or pattern of the stored state data. Having learnt the correlation, the logic unit is arranged to communicate its interrupt signal to the processing unit via its interrupt line in response to the recognition of the subset or pattern within the stored state data accumulated in the time-line. The danger interrupt service routine accesses the logic unit state line(s) in order to determine and then apply corrective action, for instance by providing corrective data on the output line which pre-empts the receipt of another instance of the danger signal.

The logic unit is typically arranged to learn a correlation between assertion of the danger signal on the danger signal input line and an associated pattern identified within the stored state data. Typically the logic unit is arranged to store multiple correlations derived from past experience.

The logic unit may be arranged to learn a correlation between the receipt of only a single instance of the danger signal on the danger signal input line and the subset of the stored state data, but more typically it is arranged to learn a correlation between the receipt of multiple instances of the danger signal on the danger signal input line and the subset of the stored state data.

The stored state data may be stored by the logic unit in a memory which is external to the logic unit, but more typically the logic unit comprises a logic unit memory such as a shift register or random access memory; and the stored state data is stored in the logic unit memory.

Typically the danger interrupt service routine accesses the stored state data via the logic unit state line(s) in order to determine the corrective action. In one embodiment the stored state data in the logic unit memory comprises a time-line of at least two values: a current value and a previous value; the microcontroller comprises a timer register; and the corrective action comprises writing the previous value from the logic unit memory into the timer register, over-writing the current value.

Optionally the logic unit comprises an OR-gate which is arranged to communicate its interrupt signal to the processing unit via its interrupt line in response to receipt of the danger signal on the danger signal input line or in response to receipt recognition of a pattern found within the stored state data from the processor state line(s).

The programmable memory may be a flash memory or another type of programmable memory, and the normal control routine may be in the form of firmware for example.

The logic unit optionally comprises a time series unit arranged to store the processor state data from the state line(s) in a timeline in a logic unit memory; and a time series processing unit arranged to learn the correlation between the receipt of the danger signal(s) on the danger signal input line and patterns within the stored state data in the logic unit memory.

A further aspect of the invention provides a system comprising a device; and a microcontroller according to the first aspect of the invention with its output line connected to the device so that it can control the device by means of the output data on the output line. The device may comprise a motor or other load, for example. Typically the microcontroller is provided as an embedded system.

Optionally a sensor is arranged to monitor the device, generate the danger signal, and input the danger signal to the danger signal input line of the microcontroller.

The output line may be used solely for controlling the device by means of the output data on the output line. Alternatively the output line may be an input/output line, and the processing unit is arranged to execute the normal control routine in order to both monitor and control the device via the input/output line.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
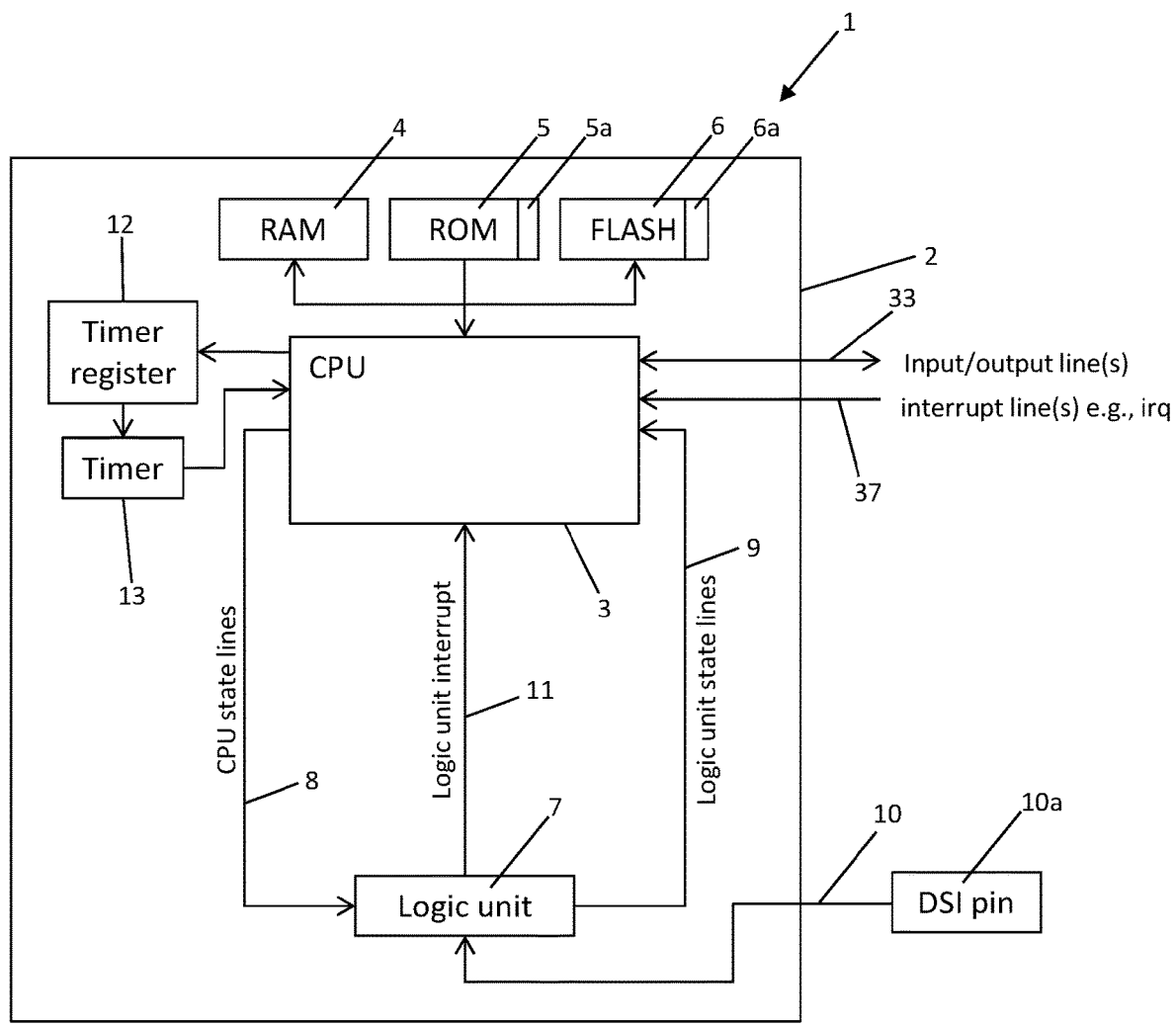
FIG. 1 shows a microcontroller.

FIG. 1 shows a microcontroller 1 according to an embodiment of the invention. All elements of the microcontroller 1 are fabricated on a single chip or die 2 of semiconductor material.

The microcontroller comprises a central processing unit (CPU) 3, random access memory (RAM) 4, read only memory (ROM) 5, flash memory 6, a timer register 12, a timer 13, and a logic unit 7. The microcontroller also has various other peripheral devices such as serial ports which are not shown. The ROM 5 stores a danger interrupt service routine 5a and the flash memory 6 stores a normal control routine 6a. The CPU 3 is arranged to execute the normal control routine 6a in order to monitor and control the devices connected to its input/output lines 33. The functions of the logic unit 7 can be provided by dedicated logic or a dedicated processing core with its code fixed in ROM.

CPU state lines 8 run between the CPU 3 and the logic unit 7 for communicating CPU state data from the CPU 3 to the logic unit 7, so the logic unit 7 can read the CPU's state via the CPU state lines 8. Logic unit state lines 9 run between the logic unit 7 and the CPU 3 for communicating logic unit state data from the logic unit 7 to the CPU 3, so the CPU 3 can read the logic unit's state via the logic unit state lines 9.

A Danger Signal Input (DSI) line 10, accessed via a DSI pin 10a, is connected to the logic unit 7 and dedicated to communicating danger signals to the logic unit 7. The logic unit 7 is stimulated by the receipt of a danger signal on the DSI line 10, and can assert a non-maskable interrupt signal on the CPU 3 via a logic unit interrupt line 11 as described in further detail below.

Figure 2:
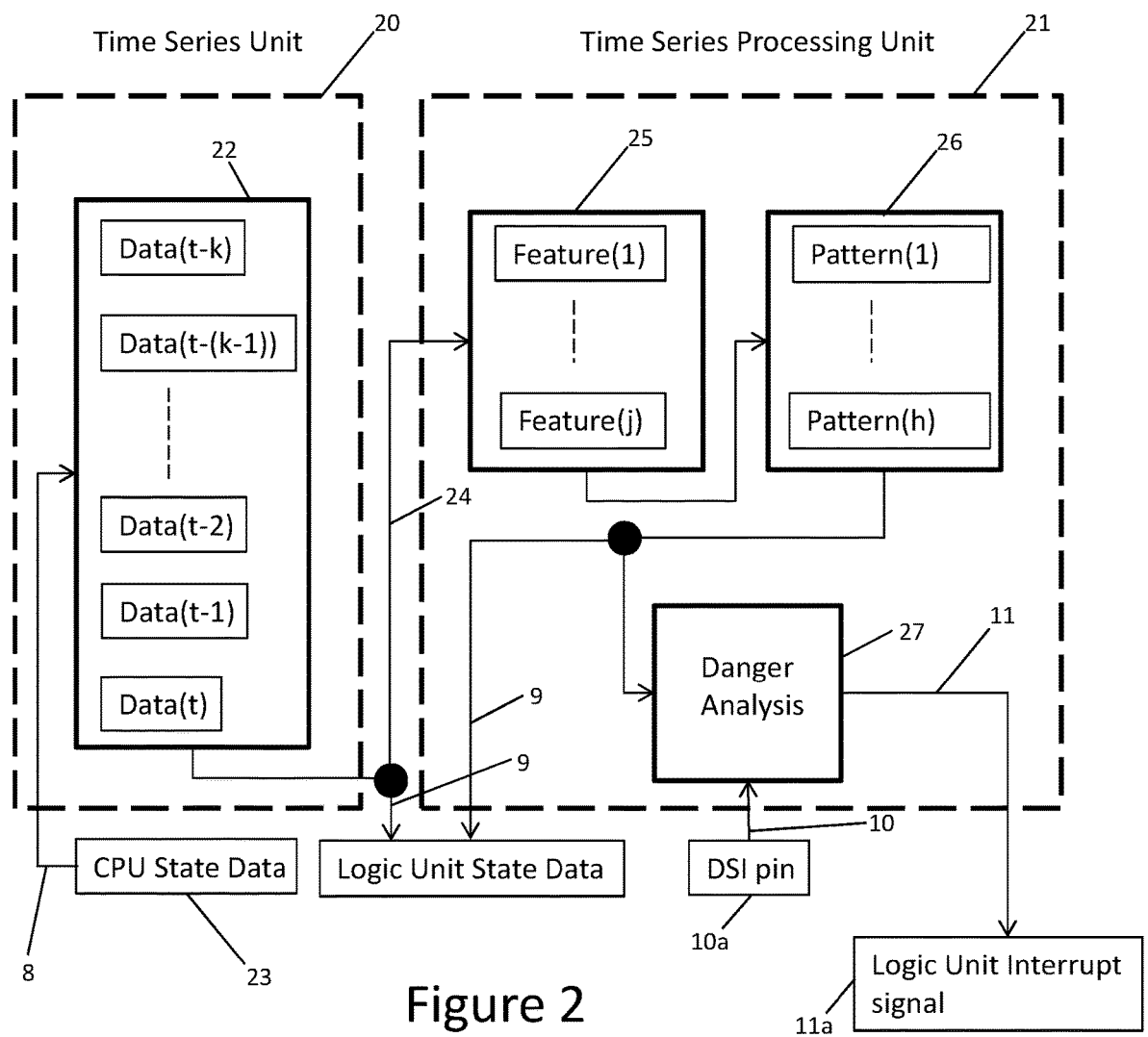
FIG. 2 shows the functional elements of the logic unit.

Inside the logic unit 3 are two functional subsystems shown in FIG. 2: a Time Series Unit (TSU) 20, and a Time Series Processing Unit (TSPU) 21. The TSU 20 accumulates a current timeline 22 of CPU state data 23 from the CPU state lines 8, and passes this timeline 22 to the TSPU 21 via a path 24. The stored CPU state data in the timeline 22 is made available to the CPU 3 for reading via the logic unit state lines 9.

The TSPU 21 is arranged to learn a correlation between the receipt of a danger signal on the DSI line 10 and a subset of the stored CPU state data in the timeline 22—each subset having a particular pattern or sequence. In other words, the TSPU 21 takes the current timeline 22 and seeks to learn the association between assertion of the DSI line 10 and a particular pattern or sequence within the timeline 22 which precedes the assertion. Learning this association can be as simple as a direct lookup of the timeline 22 in a memory device. Alternatively a feature extraction block 25 provides a more complex extraction of features within the timeline 22 which it feeds to a learning block 26. The learning block 26 then provides learning and subsequent recognition of patterns of features from the feature extraction block 25, the patterns of features being labelled Pattern(1) . . . Pattern(h) in FIG. 2.

A danger analysis block 27 has two functions: initially it assigns a danger value to the current patterns of features depending upon activity on the DSI line 10; and subsequently it weighs up the threat posed by the current clues found in the timeline 22 and determines whether action needs to be taken. As with the TSU 20, the patterns of features from the TSPU 21 are available for reading by the CPU 3 via the logic unit state lines 9.

After sufficient multiple instances of CPU state data 23 being paired with the danger signal on the DSI line 10, the logic unit 7 pre-empts the conditions leading to assertion of the DSI line 10 by recognising the clues from earlier situations and automatically asserts the logic unit interrupt line 11, so that an interrupt signal 11a is communicated from the logic unit 7 to the CPU 3 via the logic unit interrupt line 11 before the DSI line 10 is asserted. In other words, the logic unit 7 is arranged to monitor the CPU state data in the timeline 22 and communicate the interrupt signal 11a to the CPU 3 via the interrupt line 11 when it detects a particular subset or pattern of the CPU state data in the timeline 22. The logic unit 7 effectively learns that a particular pattern of CPU state data precedes assertion of the DSI line 10, so it can automatically assert the logic unit interrupt line 11 before the problem occurs—in other words it provides pre-emptive action before the DSI line 10 is asserted.

Figure 3:
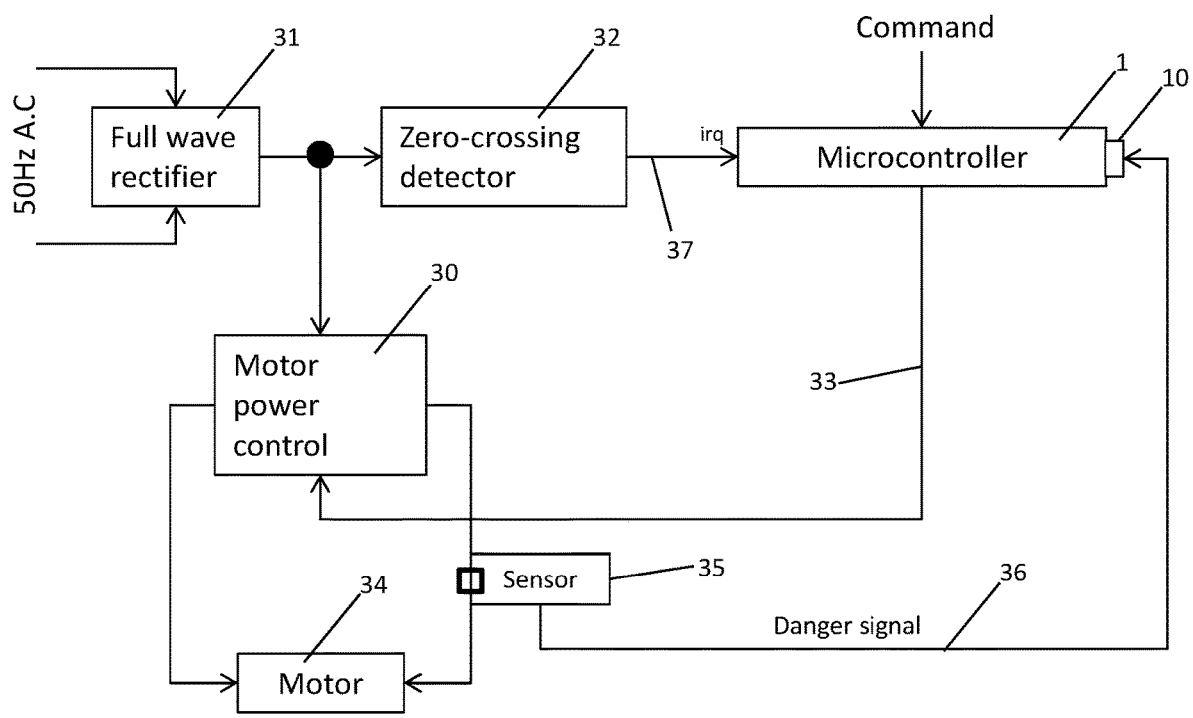
FIG. 3 shows a system incorporating the microcontroller as an example embedded system.

FIG. 3 shows an illustrative example of the microcontroller 1 as an embedded system for controlling an electric motor 34 via a thyristor-based motor power control circuit 30. This motor 34 in turn might be connected to a large pump in a petrochemical works, a winch that operates a lift in a building, or a reaction wheel.

The normal control routine 6a is stored in the form of firmware in the flash memory 6, and this firmware can be updated as part of a service-pack that is sent out and installed by field engineers that call on customers. When operating normally, the normal control routine smoothly ramps the motor 34 from rest to a speed appropriate to the application, then ramps back down again to complete the task. For instance the microcontroller 1 may be part of a service-lift installation used to ferry heavy loads up and down a building.

As part of the lift installation, a programmable logic controller (PLC) and slave devices (not shown) read control panels and sensors, operate service hatches and a winch (also not shown), and schedule lift arrival to meet some developing statistical distribution of how many calls are made to which floors. The microcontroller 1 is a component of the PLC's slave device that in turn controls the winch motor.

Figure 4:
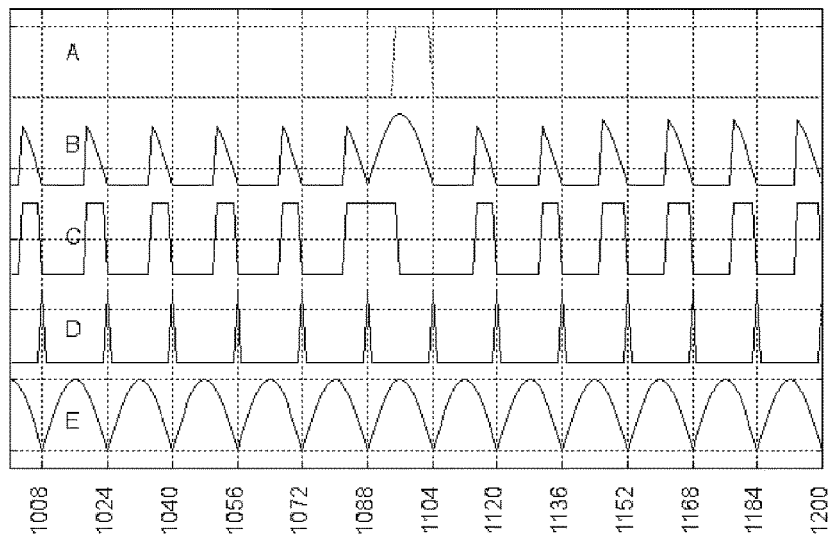
FIG. 4 is a timing diagram generated from a simulation of the example embedded system.

FIG. 4 is a timing diagram with five traces labelled A to E. Trace E shows the output of a full-wave rectifier 31 driven from a 50 Hz A.C supply. The output of the rectifier 31 is used both for supplying power to the motor power control circuit 30 and also as a timing reference via a zero-crossing detector 32. The output from the zero-crossing detector 32 is shown in trace D, giving a spike every 10 ms. Each data point in FIG. 4 is sampled at intervals of 625 us.

The zero-crossing detector signal (trace D) is used to drive an interrupt line 37 on the microcontroller 1. On assertion of this interrupt, its service routine in 6*a* is called. This service routine in 6*a* loads the microcontroller's 4-bit timer register 12 with a count-down value, which then starts to be decremented at a rate determined by a prescaler from a base clock giving, in this example, 1.6 kHz.

While the timer 13 counts down, the output line 33 of the microcontroller 1 is set low. On reaching zero, the input/output line 33 is set high and the timer 13 halts counting. Accordingly, by varying the value loaded into the timer register 12, the mark-space ratio of the signal on the input/output line 33 will also vary. An example of this output behaving normally is shown by trace C up to sample point 1072, and after point 1120.

The input/output line 33 is used to drive the motor power control circuit 30, with its supply taken from the rectifier output (trace E). Thus the drive voltage provided for the motor 34 is given in trace B, whereby the proportion of each half-cycle in trace E is selected by the pulse-width in trace C.

As part of an update to make the service-lift quicker to respond to a call, a service-pack is put together that updates the statistical handling as well as motor controller firmware.

The modification to the normal control routine in 6*a* is a simple one, and adjusts the ramp rate so that the motor 34 accelerates a little more quickly than originally programmed and just consists of changing some motor parameters. However, this install not only overwrites the original motor parameters, but also the rest of the normal control routine 6*a*—it is an image, such is the case with flash-programmable devices.

Malicious code may be present in the service-pack, possibly by way of a lapse of human security or a deliberate act. More than just a couple of parameters may have been adjusted in the firmware image and now a change has been made to the ramp algorithm too.

Essentially a small modification has been made to the ramp control code so that, once in a while, the timing waveform used to control the switching point in the mains cycle for delivering power to the motor changes radically.

A sudden change in the ramp timing will (in this example) suddenly switch the motor to near high-speed for only a fraction of a second. This will result in a sudden increase in torque and the motor will 'kick' anything it is connected to—in this case the service-lift and anything carried in it.

As the service-lift carries equipment, and not people, the shocks delivered to the winch mechanics go unnoticed, and over time the mechanical stress shortens the lifetime of the mechanism. Eventually a critical point is reached and the drive-shaft coupling the motor to the winch assembly shatters.

During the software update as described above, malware affects the value loaded into the timer register 12 such that occasionally high-power is suddenly provided to the motor 34 via the motor power control circuit 30. Between sample points 1088 and 1104 the malware loads a high-speed setting for the motor 34 into the timer register 12, during a slow controlled ramp up to a set speed. See trace B and C between sample points 1088 and 1104 in FIG. 4. This results in the motor 'kicking', shocking the mechanism to which it is connected. After long-term attacks on the winch mechanics, the system integrity falls below a safe level and the assembly fails. The long-term nature of these attacks makes it difficult to isolate the source of the intrusion and indeed the tracing of the cause.

A sensor 35 monitors the output of the motor power control circuit 30. A binary output of the sensor 35 is output on a danger signal line 36 which is connected to the DSI pin 10*a* of the microcontroller 1. Trace A shows the binary output of the sensor 35 pulsing during the malware attack between samples 1088 and 1104. This binary output of the sensor 35 is used to assert the DSI line 10 of the microcontroller 1 via the danger signal line 36. Consequently each pulse on this danger signal line 36 is regarded as an 'error' during motor drive.

Figure 5:
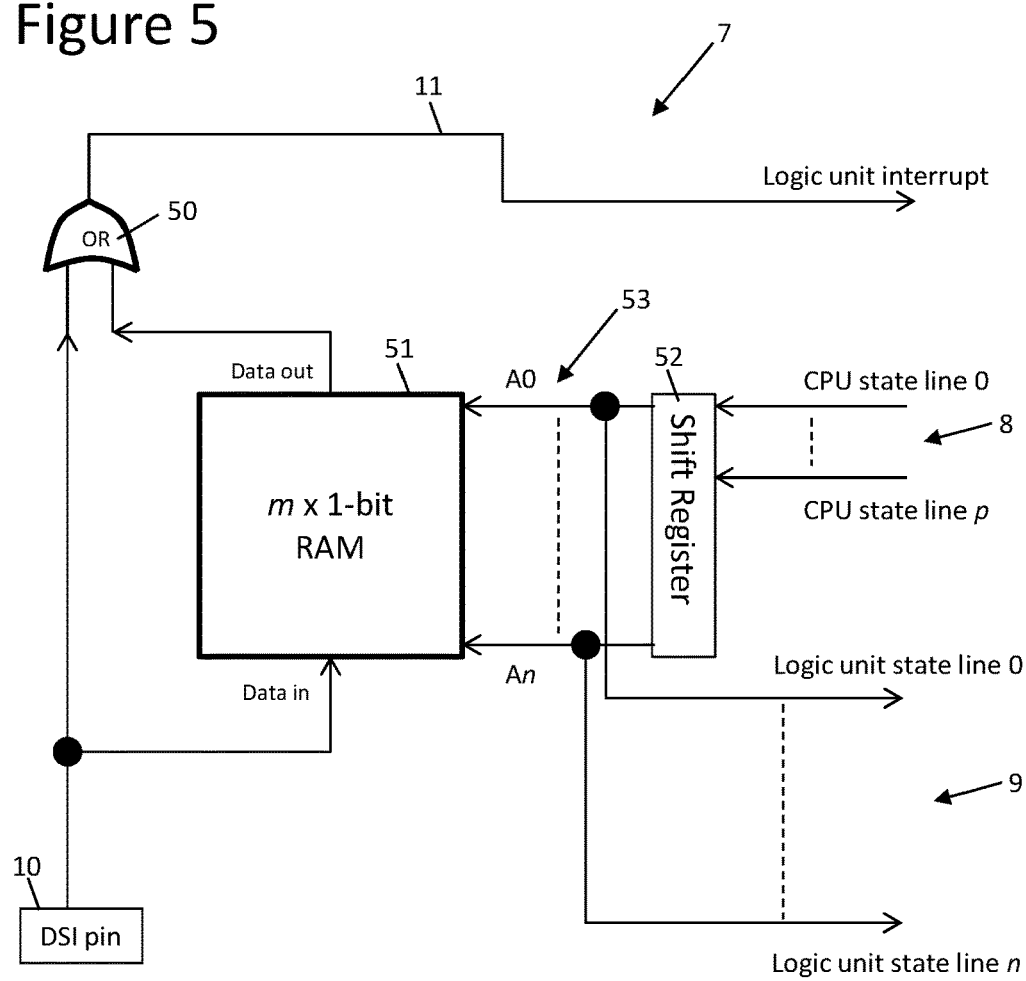
FIG. 5 shows a possible implementation of the logic unit for the example embedded system.

FIG. 5 gives a simple example of the architecture of the logic unit 7, in this case comprising an OR-gate 50, a Random-Access Memory (RAM) 51 and a shift register 52. The shift register 52 accepts p+1 bits in parallel from the CPU state lines 8, and with every presentation shifts the pattern through its internal registers. In this example there are two 4-bit values in the shift register 52: a current value and a previous value. The bit-pattern is taken from writes to the CPU timer register 12 and thus form the CPU state monitored. Outputs from the shift register 52 internals (n+1 bits, which is a multiple of p+1) are used to address the m×1-bit RAM 51 (where m is given by $2^{n+1}$). The output lines 53 of the shift register 52 form the logic unit state and are readable by the CPU 3.

Activity on the DSI line 10 does two things: it asserts the logic unit interrupt line 11 via the OR-gate 50, and also causes a binary 1 to be written to the RAM 51 at the address given by the outputs 53 of the shift register 52. Thus, the contents of the RAM 51 contains associations between assertion of the DSI line 10 and CPU state data stored in the shift register 52. Here as the timer 13 and the timer register 12 are 4-bits wide, p=3 and for simplicity n=7, hence the RAM is arranged as 256×1-bits and the shift register 52 stores two successive parallel loads of 4-bits.

Assertion of the logic unit interrupt line 11 between the logic unit 7 and the CPU 3 causes the CPU 3 to pause in its programmed execution and call the danger interrupt service routine 5*a* stored in the ROM 5. This danger interrupt service routine 5*a* inspects the contents of the logic unit's shift register 52 and applies corrective action by writing the previous value from the shift register 52 into the timer register 12, over-writing the current value in the timer register 12.

Figure 6:
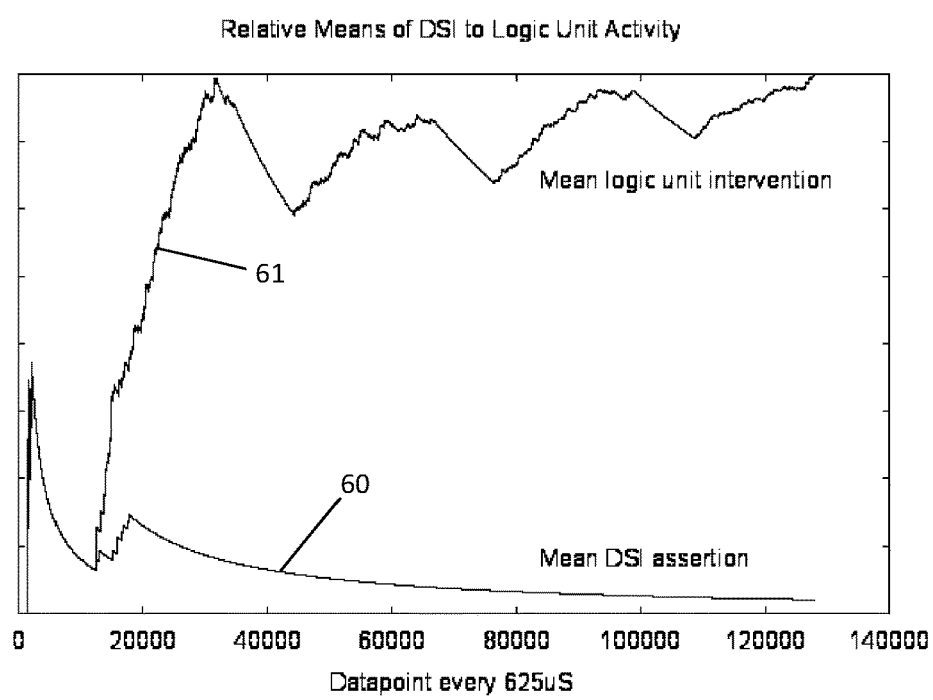
FIG. 6 shows the variation over time of DSI assertion and logic unit intervention.

Because the logic unit interrupt line 11 is driven by an OR gate 50 whose inputs are the DSI line 10 and the output bit from the RAM 51, once a pair of timer register values has been associated with assertion of the DSI line 10, as soon as they appear again in the shift register 52 the logic interrupt line 11 is asserted, pre-empting a fault detected by the sensor 35. Thus, the danger interrupt service routine 5*a* for handling logic unit events is called before a fault has a chance to occur. As a result, the number of times the DSI line 10 is asserted falls as the logic unit intervention increases. This behaviour is illustrated in FIG. 6. Trace 60 in FIG. 6 shows the mean DSI line assertion decreasing over time, and trace 61 shows the mean logic unit intervention increasing over time.

The shift register 52 in FIG. 5 contains the timeline of stored CPU state data and thus performs the function of the TSU 20 of FIG. 2; and the OR-gate 50 and RAM 51 together provide the TSPU 21 of FIG. 2. The feature extraction and learning functions of the TSPU 21 are implemented by direct addressing into the RAM 51. The danger analysis block 27 of FIG. 2 is implemented in the architecture of FIG. 5 by the reading/writing of a binary one stored at the current address.

In summary, the logic unit 7, DSI input 10, dedicated interrupt line 11, monitoring lines 8 and 9, together with service routine 5a in ROM provides the microcontroller 1 with a built-in self-healing function. The logic unit 7 is arranged to communicate the interrupt signal 11a to the CPU 3 via the logic unit interrupt line 11 in response to receipt of the danger signal (trace A) on the DSI line 10. This interrupt signal 11a is non-maskable, so the CPU 3 cannot ignore it, and the logic unit interrupt line 11 between the logic unit 7 and the CPU 3 is dedicated to communicating the interrupt signal 11a from the logic unit 7 to the CPU 3. The logic unit 7 is also separate from the CPU 3 so that the CPU 3 cannot change any aspect of the operation of the logic unit 7 and the logic unit 7 cannot be by-passed by software.

The CPU 3 is arranged to always respond to the receipt of the interrupt signal from the logic unit 7 on the logic unit interrupt line 11 by interrupting the normal control routine 6a, or any other routine executing on the CPU 3, and executing the danger interrupt service routine 5a stored in the ROM 5. This danger interrupt service routine 5a provides a course of corrective action and is dedicated to handling interrupt signals 11a from the logic unit 7. The danger interrupt service routine 5a accesses the logic unit state lines 9 in order to determine and apply the corrective action. The logic unit 7 has a TSU 20 which is arranged to store a timeline of CPU state data 23 from the CPU state lines. This CPU state data 23 is associated with the normal control routine 6a executing on the CPU 3. The TSPU 21 of the logic unit 7 is arranged to learn a correlation between the receipt of multiple instances of the danger signal on the DSI line 10 and a subset of the CPU state data 23. Having learnt the correlation with a particular subset of the CPU state data 23, the logic unit 7 is then arranged to automatically communicate an interrupt signal 11a to the CPU 3 via the interrupt line 11 in response to the receipt of that particular subset of the stored CPU state data 23 on the CPU state lines 8, so the CPU 3 then automatically executes the danger interrupt service routine 5a thereby providing the corrective action and pre-empting the receipt of another instance of the danger signal. So the TSPU 21 builds a model of CPU state data 23, and using a self-healing approach the danger signal gradually becomes associated with certain patterns of CPU activity.

Although the invention has been described above with reference to one or more preferred embodiments, it will be appreciated that various changes or modifications may be made without departing from the scope of the invention as defined in the appended claims.

The invention claimed is:

1. A microcontroller comprising:
a programmable memory storing a normal control routine;
an output line;
a processing unit arranged to execute the normal control routine to provide output data on the output line;
a logic unit;
a danger signal input line connected to the logic unit and dedicated to communicating a danger signal to the logic unit;
one or more processor state lines between the processing unit and the logic unit for communicating processor state data from the processing unit to the logic unit;
one or more logic unit state lines between the logic unit and the processing unit for communicating logic unit state data from the logic unit to the processing unit;
an interrupt line between the logic unit and the processing unit dedicated to communicating an interrupt signal from the logic unit to the processing unit; and
a read-only-memory storing a danger interrupt service routine,
wherein the logic unit is arranged to communicate the interrupt signal to the processing unit via the interrupt line in response to receipt of the danger signal on the danger signal input line;
the processing unit is arranged to always respond to the receipt of the interrupt signal from the logic unit on the interrupt line by interrupting the normal control routine, or any other routine executing on the processing unit, and executing the danger interrupt service routine stored in the read-only memory,
wherein the danger interrupt service routine accesses the one or more logic unit state lines to determine and apply corrective action; the logic unit is arranged to store processor state data from the one or more processor state lines to provide stored state data, the stored state data being associated with the normal control routine executing on the processing unit; the logic unit is arranged to learn a correlation between the receipt of the danger signal on the danger signal input line and a subset of the stored state data; and having learnt the correlation, the logic unit is arranged to communicate the interrupt signal to the processing unit via the interrupt line in response to the receipt of the subset of the stored state data on the one or more processor state lines;
wherein the logic unit is arranged to communicate the interrupt signal to the processing unit via the interrupt line in response to the receipt of the subset of the stored state data on the one or more processor state lines, pre-empting the receipt of another instance of the danger signal, and
wherein the logic unit is arranged to learn a correlation between the receipt of multiple instances of the danger signal on the danger signal input line and the subset of the stored state data.

2. The microcontroller of claim 1, wherein the programmable memory, the processing unit, the logic unit and the read-only-memory are on a single chip of semiconductor material.

3. The microcontroller of claim 1, wherein the logic unit comprises a logic unit memory; and the stored state data is stored in the logic unit memory.

4. The microcontroller of claim 1, wherein the logic unit is separate from the processing unit so that the processing unit cannot change any aspect of the operation of the logic unit.

5. The microcontroller of claim 1, wherein the programmable memory is a flash memory.

6. The microcontroller of claim 1, wherein the output line is an input/output line.

7. The microcontroller of claim 1, wherein the danger interrupt service routine accesses the stored state data via the one or more logic unit state to determine the corrective action.

8. A microcontroller comprising:
a programmable memory storing a normal control routine;
an output line;
a processing unit arranged to execute the normal control routine to provide output data on the output line;
a logic unit;
a danger signal input line connected to the logic unit and dedicated to communicating a danger signal to the logic unit;
one or more processor state lines between the processing unit and the logic unit for communicating processor state data from the processing unit to the logic unit;
one or more logic unit state lines between the logic unit and the processing unit for communicating logic unit state data from the logic unit to the processing unit;
an interrupt line between the logic unit and the processing unit dedicated to communicating an interrupt signal from the logic unit to the processing unit; and
a read-only-memory storing a danger interrupt service routine,
wherein the logic unit is arranged to communicate the interrupt signal to the processing unit via the interrupt line in response to receipt of the danger signal on the danger signal input line;
the processing unit is arranged to always respond to the receipt of the interrupt signal from the logic unit on the interrupt line by interrupting the normal control routine, or any other routine executing on the processing unit, and executing the danger interrupt service routine stored in the read-only memory,
wherein the danger interrupt service routine accesses the one or more logic unit state lines to determine and apply corrective action; the logic unit is arranged to store processor state data from the one or more processor state lines to provide stored state data, the stored state data being associated with the normal control routine executing on the processing unit; the logic unit is arranged to learn a correlation between the receipt of the danger signal on the danger signal input line and a subset of the stored state data; and having learnt the correlation, the logic unit is arranged to communicate the interrupt signal to the processing unit via the interrupt line in response to the receipt of the subset of the stored state data on the one or more processor state lines; and
wherein the logic unit comprises an OR-gate which is arranged to communicate the interrupt signal to the processing unit via the interrupt line in response to receipt of the danger signal on the danger signal input line or in response to the receipt of the subset of the stored state data on the processor state line(s).

9. A microcontroller comprising:
a programmable memory storing a normal control routine;
an output line;
a processing unit arranged to execute the normal control routine to provide output data on the output line;
a logic unit;
a danger signal input line connected to the logic unit and dedicated to communicating a danger signal to the logic unit;
one or more processor state lines between the processing unit and the logic unit for communicating processor state data from the processing unit to the logic unit;
one or more logic unit state lines between the logic unit and the processing unit for communicating logic unit state data from the logic unit to the processing unit;
an interrupt line between the logic unit and the processing unit dedicated to communicating an interrupt signal from the logic unit to the processing unit; and
a read-only-memory storing a danger interrupt service routine,
wherein the logic unit is arranged to communicate the interrupt signal to the processing unit via the interrupt line in response to receipt of the danger signal on the danger signal input line;
the processing unit is arranged to always respond to the receipt of the interrupt signal from the logic unit on the interrupt line by interrupting the normal control routine, or any other routine executing on the processing unit, and executing the danger interrupt service routine stored in the read-only memory,
wherein the danger interrupt service routine accesses the one or more logic unit state lines to determine and apply corrective action; the logic unit is arranged to store processor state data from the one or more processor state lines to provide stored state data, the stored state data being associated with the normal control routine executing on the processing unit; the logic unit is arranged to learn a correlation between the receipt of the danger signal on the danger signal input line and a subset of the stored state data; and having learnt the correlation, the logic unit is arranged to communicate the interrupt signal to the processing unit via the interrupt line in response to the receipt of the subset of the stored state data on the one or more processor state lines; and
wherein the logic unit comprises a time series unit arranged to store the processor state data from the one or more processor state lines in a timeline in a logic unit memory; and a time series processing unit arranged to learn the correlation between the receipt of multiple instances of the danger signal on the danger signal input line and the subset of the stored state data in the logic unit memory.

* * * * *